United States Patent Office 3,346,637
Patented Oct. 10, 1967

3,346,637
PROCESS FOR THE MANUFACTURE OF 1,2-DIAMINOMETHYLCYCLOBUTANE
Kurt Sennewald, Knapsack, near Cologne, Heinz Erpenbach, Surth, near Cologne, Hugo Gudernatsch, Hermulheim, near Cologne, and Wilhelm Vogt, Knapsack, near Cologne, Germany, assignors to Knapsack-Griesheim Aktiengesellschaft, Knapsack, near Cologne, Germany, a corporation of Germany
No Drawing. Filed Aug. 27, 1964, Ser. No. 392,612
Claims priority, application Germany, Sept. 7, 1963, K 50,767
6 Claims. (Cl. 260—563)

ABSTRACT OF THE DISCLOSURE

A process for producing 1,2-diaminomethyl-cyclobutane by selectively hydrogenating 1,2-dicyano-cyclobutane in the presence of Raney-cobalt catalyst and excess ammonia.

---

The present invention is concerned with a process for the manufacture of 1,2-diaminomethyl-cyclobutane by catalytically hydrogenating 1,2-dicyanocyclobutane.

It is known that carboxylic acid nitriles can be reduced with hydrogen in the presence of a suitable hydrogenation catalyst, e.g. nickel, at a given temperature so as to obtain primary amines.

As taught in German Patent No. 1,104,936 this reaction is not generally applicable. The patent describes a process for making adipodinitrile, wherein 1,2-dicyanocyclobutane is dissolved in a polar solvent and hydrogenated with hydrogen under pressure in the presence of a nickel catalyst at a temerature of about 200 to 400° C. In this case the hydrogen does not additively combine with the —C≡N linkage of 1,2-dicyanocyclobutane with the formation of a primary diamine, which would have been expected to occur. The hydrogen will rather additively combine with the carbon atoms in the 1- and 2-positions while simultaneously splitting the cyclobutane ring with the formation of adipodinitrile.

The present invention provides a process for selectively hydrogenating the nitrile group of 1,2-dicyancyclobutane, which obviates ring splitting with the formation of 1,2-dianinomethyl-cyclobutane, in accordance with the present invention 1,2-dicyanocyclobutane is dissolved in an inert solvent, and the resulting solution is treated in the presence of a hydrogenating catalyst with hydrogen at a temperature of about 100° to 200° C. under a pressure of about 100 to 500 atmospheres (gauge pressure) and in the presence of a molar excess of ammonia; the resulting reaction mixture is released and allowed to cool, and the 1,2-diaminomethyl-cyclobutane product is removed by distillation.

The agents used for dissolving the 1,2-dicyanocyclobutane include aromatic hydrocarbons, especially toluene.

1,2-dicyanocyclobutane can be catalytically hydrogenated using conventional noble metal catalysts, such as platinum or palladium catalysts, or Raney catalysts, e.g. Raney nickel or Raney cobalt, the latter being preferred for reasons of economy. Raney cobalt has proved especially advantageous which contrary to Raney nickel minimizes the formation of pyrrolidine compounds which are obtained as by-products of the hydrogenating reaction. Raney cobalt can be prepared e.g. by decomposing an alloy consisting of equal parts of cobalt and aluminum with 50% sodium hydroxide solution (cf. Houben-Weyl, 4th edition, volume 4/2, page 175), the resulting purified catalyst being stored under alcohol until use.

In carrying out the process of the present invention, an autoclave should first be charged with the catalyst and the necessary proportion of ammonia, and the necessary working pressure should then be produced by heating the autoclave at a temperature of about 100 to 200° C. and introducing hydrogen concurrently therewith. As soon as the desired reaction conditions have been achieved, a solution of 1,2-dicyanocyclobutane in a suitable hydrocarbon is gradually added, the addition is completed and the reaction mixture then allowed to remain for some time under the reaction conditions adjusted. At the end of the reaction, the 1,2-diaminomethyl-cyclobutane produced is removed from the reaction mixture by distillation.

The 1,2-dicyanocyclobutane should preferably be hydrogenated at a temperature of about 150 to 180° C. and under a pressure of 250 to 300 atmospheres (gauge pressure), and the ammonia should be used in an excess proportion of at least 5 mols per mol of 1,2-dicyanocyclobutane.

Under these advantageous reaction conditions, the reaction time generally amounts to about 1 hour.

The 1,2-dicyanocyclobutane used as the feed product can be prepared e.g. by dimerizing acrylonitrile by the process described in German Patent No. 1,081,008.

The reaction according to the process of the present invention must be termed to take an unexpected course which would not have been expected to occur in view of the process disclosed in German Patent 1,104,936. In addition thereto, it is known art that the catalytic hydrogenation of 1,2-substituted dinitriles will produce pyrrolidine compounds while ammonia is split off, whose formation is susbtantially suppressed in the process of the present invention due to the addition of an excess proportion of ammonia to the reaction mixture.

The production of 1,2-diaminomethyl-cyclobutane deserves commercial interest, the compound being an interesting intermediate product and condensation component for use in numerous syntheses.

Example 1

A 2-liter autoclave was charged with 36 grams Raney cobalt, which had been prepared as taught by Houben-Weyl, 4th edition, volume 4/2, page 175, and with 204 grams ammonia, and a hydrogen pressure of 180 atmospheres (gauge pressure) was adjusted in the autoclave by introducing hydrogen. On heating the mixture at a temperature of 150° C., the pressure increased to 300 atmospheres (gauge pressure). 400 grams trans-1,2-dicyanocyclobutane dissolved in 400 cc. toluene were then added within 45 minutes. During such addition, the temperature in the autoclave increased to 180° C. and the pressure prevailing therein which had dropped to 250 atmospheres (gauge pressure) was brought again at 300 atmospheres (gauge pressure) by 4 to 5-times repeated introduction of hydrogen. After the addition of the 1,2-dicyanocyclobutane, the material in the autoclave was maintained for 1 hour at a temperature of 150° C. under a hydrogen pressure of 300 atmospheres (gauge pressure). The reaction mixture was then allowed to cool and the process product was removed through an immersion tube which permitted repeated use of the catalyst. The reaction mixture was subjected to fractional distillation yielding 371 grams pure trans-1,2-diaminomethyl-cyclobutane having a B.P.$_1$ of 57° C. and 25 grams unreacted 1,2-dicyanocyclobutane.

The 1,2-dicyanocyclobutane was calculated to undergo conversion at the rate of 86.3%, corresponding to a yield of 92% of the theoretical yield, calculated on the conversion rate.

Example 2

A 2-liter autoclave was charged with 36 grams Raney nickel and 204 grams ammonia and hydrogen was introduced to produce a hydrogen pressure of 180 atmospheres (gauge pressure). On heating the reaction mixture at 150° C. the pressure increased to 300 atmospheres (gauge pressure). 400 grams trans-1,2-dicyanocyclobutane dissolved in 400 cc. toluene were then added within 45 minutes. The hydrogenating reaction was carried out in the manner set forth in Example 1. The resulting reaction mixture was allowed to cool and then subjected to fractional distillation. 320 grams trans-diaminomethyl-cyclobutane, corresponding to a yield of 72%, and 98 grams of a pyrrolidine compound formed as a by-product were obtained.

Example 3

The procedure was the same as that described in Example 1 but the trans-1,2-dicyanocyclobutane was replaced with 400 grams of an isomer mixture consisting of 60% trans- and 40% cis-1,2-dicyanocyclobutane. Under the hydrogenating conditions as used in Example 1 the cis-compound was transformed to the trans-compound as indicated by the exclusive formation of trans-diamine in addition to a small proportion of pyrrolidine derivatives. Fractional distillation of the reaction mixture gave 368 grams trans-diaminomethyl-cyclobutane, corresponding to a yield of 85.6%, and 48 grams of a pyrrolidine compound.

We claim:

1. A process for preparing 1,2-diaminomethylcyclobutane comprising dissolving 1,2-dicyanocyclobutane reactant in an inert solvent, treating the resulting solution with hydrogen at a temperature of about 100–200° C. and under a pressure of about 100–500 atmospheres, in the presence of Raney-cobalt as a hydrogenating catalyst and at least a molar excess proportion of ammonia, and recovering the resulting 1,2-diaminomethylcyclobutane product from the reaction mixture.

2. A process as claimed in claim 1, wherein the inert solvent is an aromatic hydrocarbon.

3. A process as claimed in claim 2, wherein the inert solvent is toluene.

4. A process as claimed in claim 1, wherein the 1,2-dicyanocyclobutane is hydrogenated at a temperature of 150 to 180° C. under a pressure of 250 to 300 atmospheres (gauge pressure).

5. A process as claimed in claim 1, wherein the ammonia is used in an excess proportion of at least 5 mols per mol 1,2-dicyanocyclobutane.

6. A process as claimed in claim 1, wherein the hydrogenation is carried out at a temperature of 150° C. under a hydrogen pressure of 300 atmospheres (gauge pressure) and for a period of time of about 1 hour.

References Cited

UNITED STATES PATENTS

| | | | |
|---|---|---|---|
| 2,534,088 | 12/1950 | Webb | 260—563 |
| 3,163,676 | 12/1964 | Potts | 260—563 |
| 3,217,028 | 11/1965 | Vertnik | 260—563 |
| 3,232,973 | 2/1966 | Bayer et al. | 260—563 |

CHARLES B. PARKER, *Primary Examiner.*

N. WICZER, P. C. IVES, *Assistant Examiners.*